Patented June 17, 1924.

1,497,884

UNITED STATES PATENT OFFICE.

ELOISE JAMESON AND FRANCIS N. TAYLOR, OF CORONA, AND CLARENCE P. WILSON, OF POMONA, CALIFORNIA, ASSIGNORS TO CALIFORNIA FRUIT GROWERS EXCHANGE, OF LOS ANGELES, CALIFORNIA, A CORPORATION OF CALIFORNIA.

PECTIN PRODUCT AND PROCESS OF PRODUCING SAME.

No Drawing.   Application filed August 22, 1923. Serial No. 658,706.

*To all whom it may concern:*

Be it known that we, ELOISE JAMESON and FRANCIS N. TAYLOR, citizens of the United States, residing at Corona, in the county of Riverside, and CLARENCE P. WILSON, a citizen of the United States, residing at Pomona, in the county of Los Angeles, and State of California, have invented new and useful Pectin Products and Processes of Producing Same, of which the following is a specification.

This invention relates to a pectin product suitable for use in making jelly and similar products, and a process for producing the pectin product.

Heretofore, the processes employed for producing pectin products have resulted in impure products containing more or less of the vegetable materials naturally associated with the pectin and also more or less of the products resulting from chemical changes in the pectin. Pectin is a material existing naturally in a large number of organic materials such as fruits and vegetables. Pectin, however, is very readily altered and difficult to extract and purify without causing chemical changes in the pectin which will not only result in an impure pectin product but will result in a pectin product which has a low jellifying power. Pectin may be considered as octo-methylester of pectinic acid. This pectin may in the process of extraction hydrolyze or lose one or more of the methyl groups naturally present in the pectin and the resulting pectin while still possessing a jellifying power will be found to possess this power in a materially lower degree. As the methyl groups are progressively removed from the pectin, the jellifying power of the same is reduced and may be practically destroyed.

These changes in the pectin may be produced in numerous manners. Thus in the peel of citrus fruit there exists certain enzymes (called enzyme pectinase) which if brought in contact with the pectin act upon the pectin to form decomposition products of the same, finally converting the pectin to pectinic acid. Pectinic acid is not suitable for making jellies and the formation of this pectinic acid not only destroys the useful pectin but dilutes the pectin not destroyed and operates to prevent the jellying of the pectin product. The pectin is likewise deteriorated by heating to high temperatures such as over 100° centigrade and this deterioration may occur at any time in the process where this high temperature is exceeded. The pectin may also be destroyed by the action of strong alkali which converts the pectin to pectinic acid salts or by the action of strong or oxidizing acids. Moreover, there are associated with the pectin in the natural state certain materials which when the pectin is extracted are normally suspended in the extract or form milky liquids in the extract. The pectin normally produced from such an extract will produce a cloudy jelly. This will not occur if these suspended solids and milky liquids are removed, as a pure pectin product will produce a brilliant and clear jelly.

An object of this invention is to provide a pectin product which will be substantially free from undesirable suspended solids and substances forming milky liquids when in solution with the pectin so that the pectin may produce a brilliant and clear jelly and a further object of this invention is to produce such a pectin product without any substantial reduction in the natural high jellifying powers of the pectin.

This invention comprehends that while citrus fruit or the other pectin containing organic matter is in the natural state the enzyme pectinase or other enzymes are by the nature of the substances kept essentially separate from the pectin and if these enzymes are destroyed prior to the extraction of the pectin or promptly upon extraction of the pectin, the enzymes will be prevented from coming into contact with the pectin and producing any substantial deterioration of the same, and thus the formation of pectinic acid and other undesirable products of the pectin from this cause will be substantially prevented and a pure pectin product may be obtained which will have a high jellifying power. We have discovered that this destruction of the enzyme pectinase may best be effected by heating the organic matter just prior to the extraction of the pectin at a temperature slightly below 100° centigrade and for a period of time not over ten minutes.

This invention further comprehends that if sulphurous acid is employed in extracting the pectin from the organic matter an exceptionally effective extraction of the pectin may be obtained while still maintaining the decomposition of the pectin at a minimum and the employment of this acid in place of the highly ionized inorganic acids or organic acids heretofore employed will result in a more efficient extraction and a purer product than has heretofore been obtainable.

This invention further comprehends that when preparing a pectin product from lemons, oranges, or similar citrus fruits a large quantity of those materials which normally form suspended solids and certain milky liquids in the extract may be removed by washing the pulp before the extraction of the pectin, and, if this washing is conducted at a temperature sufficiently low to prevent material decomposition of the pectin and in a relatively short period of time, a superior pectin product may be obtained, which product will not only produce a clear and brilliant jelly but will maintain the high original jellifying powers of the natural pectin.

This invention further comprehends that when pectin is extracted from organic matter the extract normally contains the pectin in a colloidal solution along with certain materials naturally associated with the pectin in the organic matter, and the pectin can be precipitated from such an extract in a purified form by the action of a colloid having an electric charge opposite to the charge of the colloidal pectin. The pectin thus produced may be readily freed from the precipitating agent or impurities in the extract and thus a pectin product is obtained which will be free from impurities and capable of producing a clear brilliant jelly and while maintaining substantially the natural jellifying power. We are aware that it is not new to precipitate pectin from an extract. However, this has ordinarily been accomplished by saturating the extract with certain salts which will cause a salting out of the pectin. This is a substantially different manner of precipitating the pectin than the manner disclosed in this invention and produces a substantially different product. Thus when a pectin is precipitated from a saturated solution it naturally includes a great amount of the salt or agent employed for salting out the pectin and so far as is known this salt cannot be practically removed.

We have discovered that pectin can be precipitated from its colloidal solution by a colloidal hydroxide, and this precipitation can be carried out in dilute solutions and at a low temperature, and there will result not only a pectin free from material quantities of a precipitating agent, due to the manner in which it has been precipitated, but also a pectin containing less decomposition products of the pectin, due to the employment of the low temperature in the precipitation operation. Further, the small amount of colloidal hydroxide precipitated with the pectin may be removed from the pectin product without prolonged washing and without destruction of the pectin, and without any material reduction in its jellifying powers by a process which will be hereinafter described.

The objects and advantages of this invention will be apparent from a description of a preferred process and product embodying the invention and will present themselves in the use of the invention. In the following description the process is illustrated as applied to the preparation of pectin from the peel of citrus fruits. We desire to be understood to the effect that the process described is given as an illustration of a preferred example of the invention and the invention is not to be limited to the preferred example given but the process may be modified in various manners without departing from the spirit of the invention.

When employing citrus fruit, the peel of the citrus fruit (such as may be obtained from any process for expressing the juices or oil from the fruit), is chopped into pieces ranging from ¼ to ½ inch in size. This chopping of the peel into small pieces is done simply to facilitate the extraction of the pectin and is not essential to the operation of the process or the preparation of the product.

The peel should then be heated to a temperature sufficient to destroy the enzyme pectinase in the peel so that when the pectin is extracted these enzymes will not act upon the pectin to decompose same or to form pectinic acid. This heating should be conducted with extreme care to prevent overheating of the pectin which would result in a decomposition thereof, the temperature to which the peel should be heated should not exceed 100° C. and the peel should not be heated substantially more than ten minutes. While it is preferable to destroy these enzymes prior to the extraction the enzymes may be destroyed immediately upon extraction by a simple heating step, although slight decomposition of the pectin may result.

After the enzymes have been destroyed it is desirable to wash the raw material with water to remove the majority of those substances which if permitted to pass into the pectin extract would form fine suspended solids and milky liquids. While this washing will extract a small amount of pectin the removal of the undesired impurities as well as a large number of any of the products between pectin and pectinic acid present will far offset this loss of pectin. The washing of the raw material is carried out with water which should not be heated to its boiling point. The washing process should not be unduly repeated on account of the loss of pectin and for the reason that pectin should not be exposed to high temperature any longer than is necessary in the process.

The pectin is then extracted from the washed and purified peel by the use of an acidified water which is preferably not heated to a temperature over 100° C. The extraction may consist of a number of extraction steps, stepping up the extraction to give a concentrated pectin extract or the extraction may be conducted in one step by the use of a large volume of the acidified water. We find it preferable to employ a single extraction to lessen the handling of the pulp and exposure thereof to the high temperature. Six to eight volumes of acidified water to every volume of pulp employed will give an efficient extraction. In general the best results are obtained when the temperature of the acidified water is maintained between 80 and 90° C.

Inorganic acids and some organic acids may be used in this extraction operation but we have determined that the employment of sulphurous acid will result in a materially more satisfactory extraction of pectin and less decomposition of the pectin during the extraction period than any other acid or agent so far employed. This acid should be employed for the best results in concentrations from ¼ to 1%. The extract so obtained contains pectin in colloidal form and the solution may also contain small amounts of fine suspended solids and milky liquids not removed by the prior washing step and the extract will appear slightly opalescent or cloudy. The entrained matter and part of such suspended solids may be removed by settling the extract followed by decantation or by the use of various filtering or centrifugal apparatus. We have found the addition of paper pulp to the extract followed by filtration through a filter will remove a substantial quantity of such impurities and also that a substantial quantity of the same may be filtered out upon the pulp from which the extract is formed by carefully drawing off the extract through the same.

The clarified solution may then be concentrated or dried to obtain the pectin. However, in such a case, the concentration and drying of the pectin will result in some decomposition of the pectin with a loss in jellifying powers and the concentrated or dried product will contain certain impurities or vegetable matter naturally associated with the pectin, which will be imparted to the jelly or other material produced by the pectin and the clearest and most brilliant jelly cannot be obtained. We have found that materially less decomposition of the pectin will occur and a pectin product containing considerably less of the impurities will be produced, if the pectin is precipitated from the extract in the preferred manner. This is accomplished by the action of a colloid having a charge opposite to the charge of the colloidal pectin. The colloidal precipitating agent is most effective in the presence of an electrolyte having an ion in common with the colloid and under such conditions will precipitate the colloidal pectin from the solution even when the solution is dilute and at a low temperature. While various colloids may be employed to accomplish this precipitation, providing the colloid is oppositely charged to the colloid of the pectin, we find the employment of colloidal hydroxides to be preferable. This colloidal hydroxide may be introduced into the colloidal pectin extract in the following manners.

The extract is first made slightly alkaline with a solution of a weak alkali, ammonia being preferred for this purpose. A metallic salt is then added, which in the presence of the weak alkali (ammonia) will form a colloidal hydroxide. The quantity of metallic salt added should be such that the resultant action with the pectin extract and ammonia or weak alkali will neutralize or render the solution very slightly acidic. As a metallic salt we prefer to employ either magnesium sulphate, alum or aluminum sulphate, aluminum sulphate having been found most satisfactory. The quantity of weak base or ammonia and the quantity of metallic salt or aluminum sulphate to be added to the extract of pectin can be best determined by experimental tests upon small quantities of the actual pectin solution to be treated. To different examples of the pectin extract are added different quantities of the weak base and metallic salt and the sample giving the best amount and quality of the precipitated pectin indicates the correct proportions to be employed. A slight excess of the metallic salt or aluminum sulphate will furnish the desired electrolyte for the solution. It is also possible to prepare the aluminum hydroxide and apply it instead of forming aluminum hydroxide in the extract. Such aluminum hydroxide is the active precipitating agent of the process being a colloidal hydroxide of an opposite charge to the charge of the colloidal pectin. On addition of such colloidal hydroxide the pectin will then be precipitated from the extract. It is generally found that slightly more of the metallic salt is required than the mass of pectin which will be found in the solution. A colloidal hydroxide such as aluminum hydroxide may also be supplied by adding to the extract a salt which is highly dissociated by water and forms after dissociation a colloidal hydroxide. Aluminum acetate is an example of such a salt.

Thus pectin may be precipitated from the extract by simply adding aluminum acetate.

By this method a pectin product is prepared which possesses both a high jellifying power, due to its high average content of methyl groups, and this pectin is freed from materials forming suspended solids or milky liquids and will produce a clear, brilliant jelly. The precipitated pectin may be separated from the solution by any one of a number of filtering devices or by centrifugal apparatus, or the mother liquor may be decanted off. We have found the separation may be most readily accomplished if the solution is aerated by some suitable method such as injecting into the solution a fine spray of air or by running a stream of the solution on to a revolving disk. The areation of the solution serves to attach minute air bubbles to the pectin and cause the pectin to separate from the mother liquor and rise to the top of the liquor forming a compact scum.

After the separation of the pectin from the mother liquor the pectin is then washed with water until it is free of the soluble salt. There being but a slight excess of the soluble salt in the extract, only a slight amount of salt is precipitated with the pectin and this washing may readily be accomplished. The washing is best accomplished by agitating the precipitate with the wash water, allowing the mass to stand, and drawing off the wash water from the precipitate. The washed pectin contains a large amount of water. This water is difficult to separate by common forms of filtering apparatus but can be removed in contrifugal machines. We find, however, that the most satisfactory results are accomplished by the use of a hydraulic press. The pectin is then dried in a suitable apparatus wherein it should not be heated over 100° C. and the drying should be accomplished in the shortest time necessary to remove the water. Vacuum or air driers may be used or a spray drying machine.

The pectin should then be ground to a fine powder after which it is ready for use. The dried product will contain a slight amount of aluminum hydroxide. We have discovered that this may be readily removed from the product by washing the dried product with alcohol containing hydrochloric acid. The amount of hydrochloric acid employed should be slightly in excess of an amount sufficient to neutralize the hydroxide in the pectin. In this manner the hydroxide is converted into aluminum chloride which is soluble in the alcohol. The pectin is then separated from the alcohol solution and may be washed with fresh alcohol to remove traces of the aluminum chloride and excess hydrochloric acid. This reagent has the additional advantage that the alcohol dissolves the natural coloring matter in the pectin product and produces a pectin which may be used in making jelly or similar products without imparting any color to the same. By the use of this washing the pectin product is freed from substantially all mineral matter and other impurities and the pectin in the product still possesses substantially the same jellifying powers as are found in the natural pectin.

While the process herein described is well suited for the purposes of our invention, our invention is not limited to the process described but various modifications may be made without departing from the spirit of the invention. Moreover, it is found that a process embodying this invention will produce a pectin product materially superior in quality to the pectins normally produced and therefore we desire to claim both the improvements in the process for producing the pectin and the improved form of pectin product provided by such process. The invention is of the scope set forth in the accompanying claims.

This application is a continuation in part of our application Serial No. 571,536, filed June 28, 1922.

We claim:

1. A dry pectin product containing pectin which retains substantially unimpaired all of the natural high jellifying powers of the pectin in the raw material, said pectin being substantially free of the impurities naturally occurring in a pectin extract, by virtue of precipitating the pectin from the extract by means of a colloidal hydroxide having a charge opposite to the charge of the pectin in the extract.

2. A pectin product substantially free of natural impurities such as color, flavor and mineral ash through precipitating the pectin from an extract of the natural material by the action of a colloid having a charge opposite to the charge of the pectin whereby the impurities of the extract are separated from the pectin without destruction of the jellifying powers of the same, said product being further free from the precipitating agent by removing the same with alcohol and hydrochloric acid.

3. A process of producing pectin, which includes forming an extract of pectin from organic matter by treating the organic matter with an acid solution, and precipitating the pectin from the extract by the action of an oppositely charged colloid.

4. A process of producing pectin, which includes forming an extract of pectin from organic matter by treating the organic matter with an acid solution, and precipitating the pectin from the extract by the action of a colloidal hydroxide having a charge opposite to that of the colloidal pectin.

5. A process of producing pectin, which includes forming an extract of pectin from organic matter, and precipitating the pectin from the extract by the action of a colloidal hydroxide having an opposite charge from the colloidal pectin.

6. A process of producing pectin, which includes forming an extract of pectin by treating organic matter with an acid solution, and adding a weak alkali and a metallic salt to the extract, the metal of the metallic salt being adapted to form a colloidal hydroxide in the presence of the weak alkali and thereby precipitate the colloidal pectin.

7. A process of precipitating pectin from a solution of the pectin in which ammonia and an aluminum salt are added to the solution to form aluminum hydroxide.

8. The process for producing pectin in which the pectin containing material is heated prior to the extraction of the pectin to destroy the enzyme pectinase in the material, and the pectin is then extracted.

9. The process of producing pectin which includes extracting pectin from organic material by means of sulphurous acid.

10. The process of producing pectin which includes extracting pectin from organic matter by means of a solution of sulphurous acid, and adding ammonia and an aluminum salt to the extract in such proportions that colloidal aluminum hydroxide is formed in the presence of an excess of the aluminum salt such excess of the aluminum salt making the reaction of the solution after precipitation neutral or very slightly acid.

11. A process of precipitating pectin, in which an extract of pectin is treated with a colloidal hydroxide in presence of an electrolyte, whereby the pectin is precipitated.

12. A process of producing pectin, which includes extracting pectin from organic matter by treating the organic matter with a sulphurous acid solution, and precipitating the pectin from the extract by the action of a colloidal hydroxide having a charge opposite to that of the colloidal pectin.

13. A process of producing pectin, which includes extracting pectin from organic matter by treating the organic matter with an acid solution, and introducing a colloidal hydroxide having a charge opposite to that of the coloidal pectin and an electrolyte having a metal in common with the coloidal hydroxide, thereby precipitating the pectin.

14. The process of producing pectin which includes extracting pectin from citrus material by treating the citrus material with a sulphurous acid solution having a concentration of $\frac{1}{4}$ to 1%, precipitating the colloidal pectin from the extract by introducing a colloidal aluminum hydroxide into the extract and a slight amount of soluble aluminum salt, removing the precipitated pectin from the liquor, drying the pectin, neutralizing the aluminum hydroxide in the product with a solution of a suitable acid in alcohol, and washing the dried product until it is substantially free from the aluminum salt present.

Signed at Corona, Cal. this 14 day of August, 1923.

ELOISE JAMESON.
FRANCIS N. TAYLOR.
CLARENCE P. WILSON.